United States Patent
Kieffer

(10) Patent No.: US 8,517,104 B2
(45) Date of Patent: Aug. 27, 2013

(54) PROCESS FOR INCREASING THE TRANSPORT FLOW RATE OF OIL FROM PRODUCING WELLS

(75) Inventor: Jacques Kieffer, Saint-Genest-Lerpt (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 338 days.

(21) Appl. No.: 13/031,305

(22) Filed: Feb. 21, 2011

(65) Prior Publication Data

US 2011/0226472 A1  Sep. 22, 2011

(30) Foreign Application Priority Data

Mar. 22, 2010 (FR) .................................... 10 52029

(51) Int. Cl.
*E21B 43/22* (2006.01)

(52) U.S. Cl.
USPC .......................................... 166/310; 166/300

(58) Field of Classification Search
None
See application file for complete search history.

(56) References Cited

U.S. PATENT DOCUMENTS

| 4,381,241 A | * | 4/1983 | Romenesko et al. | ......... 507/127 |
| 4,659,486 A | * | 4/1987 | Harmon | ........................ 507/107 |
| 4,918,123 A | | 4/1990 | Yang et al. | |
| 2005/0049327 A1 | | 3/2005 | Jovancicevic et al. | |

OTHER PUBLICATIONS

French Search Report for FR1052029 dated Nov. 2, 2010.

* cited by examiner

*Primary Examiner* — Zakiya W Bates
(74) *Attorney, Agent, or Firm* — Heslin Rothenberg Farley & Mesiti P.C.

(57) ABSTRACT

A process for increasing, on an existing installation, the amount of water-soluble polymer in an emulsion injected into pipelines transporting oil produced at offshore oil wells, includes before injection, diluting the emulsion with fuel oil found on the platform or Floating Production Storage & Offloading unit (FPSO).

7 Claims, 1 Drawing Sheet

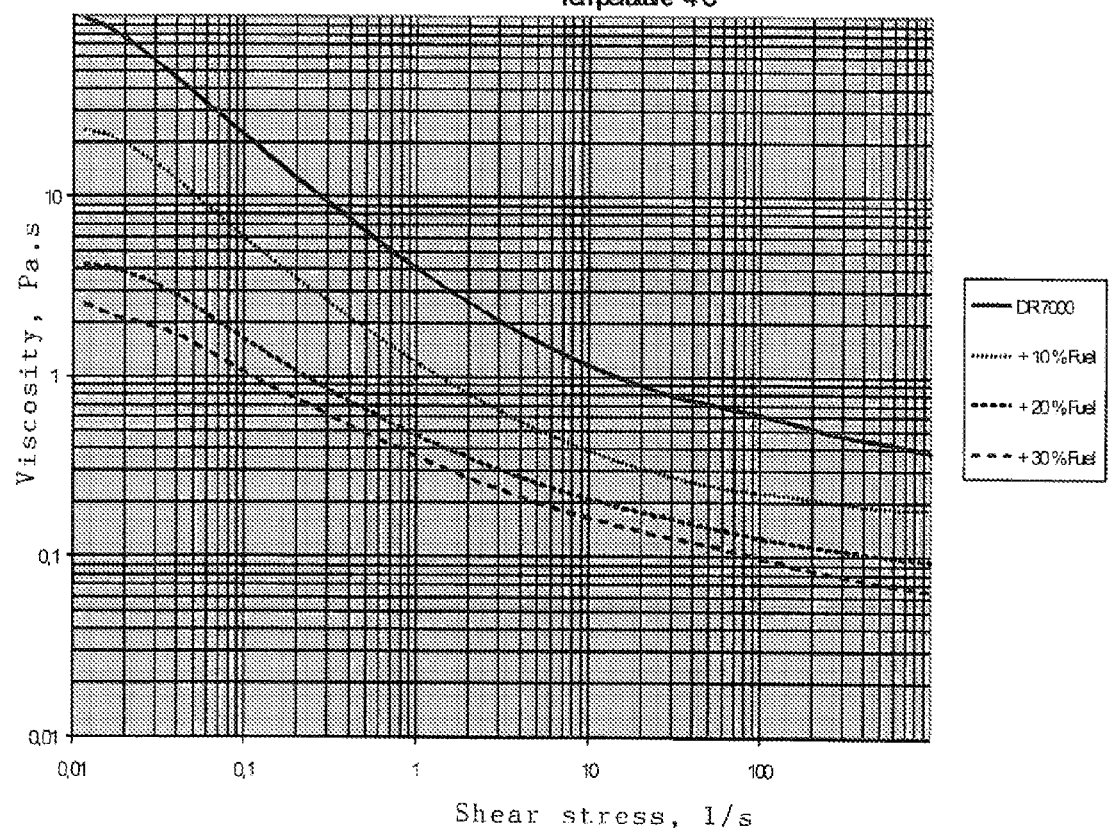

PROCESS FOR INCREASING THE TRANSPORT FLOW RATE OF OIL FROM PRODUCING WELLS

CROSS REFERENCE TO RELATED APPLICATIONS

This application claims priority of French application No. 1052029 filed on Mar. 22, 2010, the entire contents of which is hereby incorporated by reference.

BACKGROUND ART

The present invention concerns a process for increasing the flow rate at which an oil suspension is transported from the producing well by improving friction reduction. The process more particularly applies to underwater oil production, for example at offshore platforms.

Friction reduction through the addition of limited amounts of a water-soluble polymer was discovered by B. A. Toms in 1946. This is known as the "Toms effect" or "drag reduction". This addition of a very small amount of a water-soluble polymer reduces hydraulic resistance when the fluid is circulating in a normally turbulent flow, thus improving its flow. Concretely, this can lead to improved flow in the pipeline, such as when pumping injection water in oilfields or in oil production when the amount of water produced increases over time as the well is in operation (when the watercut is greater than 80%, for example).

As the oil well operates, the amount of oil produced decreases and the amount of water retrieved increases. Obviously, for the same flow rate in the production pipeline, it becomes less profitable to operate the oilfields.

That is why it is necessary to increase the transport flow rate from the producing well in which the mixture of oil (and/or gas) and water from the injection circulates. For this, the "drag reduction" technique can be used to increase the water flow rate by 20 to 30% in the transport pipeline by adding small amounts of polymers into the oil-in-water suspension.

Document US 2005/0049327 A1 describes a process for reducing friction using an anionic hydrophilic polymer. This polymer can be added in the form of dispersion in a hydrocarbon or a water-in-oil emulsion, oil being a hydrocarbon.

Use of this "drag reduction" technique is of interest:
onshore, in transport lines when the producing wells are far from the separation facilities;
offshore, by injecting the polymer into the production pipeline on the sea floor at depths of 100 to 3,000 meters and over distances of up to several kilometers.

In the latter case, a side pipe pumps the polymer in the form of an emulsion to the head of the producing well, with the polymer being dissolved along the line. The quantities injected amount to approximately 20 to 50 ppm and the pipelines and pumping systems are calculated for such amounts.

The most commonly used polymers are anionic polyacrylamides polymerized in reverse emulsion with a polymer concentration of approximately 30% by weight.

Reverse emulsions are characterized by the fact that:
1—Their viscosity is not Newtonian and decreases with shear stress.
2—Viscosity does not vary linearly with the polymer concentration.

If these installations are already in place, this operation is limited as the materials are calculated for a predetermined friction reduction. Furthermore, the temperature of seawater (approximately 4° C.) limits the flow rate in the installation.

One solution for increasing the flow rate of oil from the producing wells on an existing installation is therefore to inject more of the polymer.

Given that viscosity depends on concentration, a less viscous, and therefore diluted, emulsion must be supplied to the platform or FPSO (Floating Production Storage & Offloading unit) in order to inject more of the polymer. But in this case, the emulsion settles very quickly and forms viscous layers that solidify on the bottom of the transport containers. The installations on platforms or FPSOs are not able to re-homogenize it under local operating conditions. This solution therefore is not practically viable.

The technical problem that the invention proposes to solve, on an existing installation, is to inject more of the polymer into the production pipeline so as to increase the transport flow rate of oil from producing wells.

BRIEF SUMMARY OF THE INVENTION

The invention consists in diluting the polymer with a non-solvent found on all platforms and FPSOs, and notably the fuel oil used in various heat engines (propulsion, electricity, compressors, heating, etc.).

More particularly, the subject of the invention is a process in which the polymer injected to reduce friction is diluted beforehand with fuel oil, thus reducing the viscosity of the mixture, increasing the rate of injection and, in the end, increasing the amount of active polymer matter injected.

Fuel oil is particularly well suited as it can be found on all offshore platforms.

In other words, the subject of the invention is a process for increasing, on an existing installation, the amount of water-soluble polymer in an emulsion injected into the transport pipeline for oil produced at offshore oil wells.

The process is characterized in that, before injection, the emulsion is diluted with fuel oil found on the platform or floating production, storage & offloading (FPSO) unit.

Thus, by injecting a polymer/fuel mixture, even if the polymer concentration is decreased slightly, the viscosity is decreased enough to significantly increase the amount of active matter injected due to the increase in the rate of injection.

According to the invention, the producing well is connected to an offshore platform or to a FPSO (floating production, storage & offloading unit) by a long pipe.

According to a first characteristic, the water-soluble polymer is in the form of a reverse emulsion.

In a first embodiment:
the fuel oil is injected, for example with a displacement pump, into the existing polymer feeder pipeline before the metering pump for said emulsion polymer;
the polymer/fuel oil mixture is then metered with the emulsion polymer metering pump;
the mixture thus metered is then homogenized, for example with a static mixer providing good fluid homogenization;
the homogenized mixture thus obtained is injected into the pipeline transporting the oil produced at the producing well head.

In a second embodiment:
the emulsion polymer is metered, for example with a metering pump;
the fuel oil is then injected into the pipeline transporting the metered polymer, for example using a displacement pump;
the polymer/fuel oil mixture is then homogenized, for example with a static mixer;

the homogenized mixture thus obtained is injected into the pipeline transporting the oil suspension produced at the producing well head.

The water-soluble polymer transported, preferably presented in the form of a reverse emulsion, is advantageously diluted by adding 1 to 40% fuel oil by weight, preferably between 5 and 20%.

The polymers preferred for the invention are polymerized anionic polyacrylamides in reverse emulsion, advantageously with a polymer concentration of approximately 30% by weight. Their anionicity (acrylamide/Na acrylate ratio) is approximately between 20 and 40% with a molecular weight of 10 to 25 million g/mol.

In a preferred embodiment, the water-soluble polymer is injected in the form of a reverse emulsion containing a 70-30 acrylamide-sodium acrylate anionic polymer at a concentration of 30% with a molecular weight of 20 million.

In practice, the production of these polymers in reverse emulsion form comprises the following steps:
- dissolution of the monomers in water at a concentration of approximately 50%;
- dissolution of surfactants with a low HLB (Hydrophilic-Lipophilic Balance) in a hydrocarbon;
- emulsification of the aqueous phase into the oil phase using a mechanical device;
- degassing in a vacuum or by nitrogen injection to eliminate the oxygen;
- addition of a redox and/or azo catalyst, with the reaction maintained at a constant temperature (e.g. 50° C.) for the duration of polymerization, approximately 3 to 5 hours, or using an adiabatic process;
- after the reaction, addition of surfactants with a high HLB for reversal of the emulsion and its dissolution upon contact with water.

This process is described in many patents, including U.S. Pat. No. 4,918,123.

BRIEF DESCRIPTION OF DRAWING FIGURE

The invention and the advantages it provides can be seen in the following examples of embodiments as illustrated by the appended FIGURE.

FIG. 1 represents the viscosity curve of a water-soluble polymer diluted with fuel oil as a function of shear stress. This curve shows in a known manner that the viscosity of the water-soluble polymer used in the examples (DR7000) decreases as shear stress increases.

DETAILED DESCRIPTION

Examples

The water-soluble polymer used is an emulsion with 30% active matter and 30% anionicity and a molecular weight of approximately 20 million (product number DR 7000 by the SNF SAS company). By nature, emulsions are unstable and tend to settle. Obtaining a stable emulsion requires a precise ratio of the volume of aqueous phase in relation to the oil phase as well as surfactant mixtures to avoid settling of the aqueous phase in the oil phase. This leads to a minimum viscosity of the emulsion of 2000 cps as measured with a Brookfield device.

A pilot test was implemented using a variable-speed Triplex pump to pump the emulsion "as is" or diluted in a 100-meter-long tube.

Example 1 pipe diameter: 1 inch, inside diameter: 25.0 mm. First, the emulsion is pumped "as is" at a speed of 0.063 m/second (or 0.11 m³/h), which is the average speed for long-distance pumping.

The pressure drop observed is 2.7 bars/100 m.

The emulsions diluted by adding 10% and 20% fuel oil are then pumped, measuring the flow rate with the same pressure drop of 2.7 bars/100 m. The results are as follows:

| Emulsion | Flow rate | Pressure drop | Active matter per hour |
| --- | --- | --- | --- |
| Undiluted | 0.11 m³/h | 2.7 bars | 33 kg |
| 10% diluted | 0.37 m³/h | 2.7 bars | 100 kg |
| 20% diluted | 0.78 m³/h | 2.7 bars | 187 |

The hourly flow rate can easily be multiplied by 7 while using the same pump and the same injection pipes. This makes it possible to inject 5 times more polymer in the form of active matter into the pipeline despite the dilution.

Example 2 pipe diameter: 2 inches, inside diameter: 52.5 mm.
The results are as follows:

| | Flow rate | Pressure drop | Active matter per hour |
| --- | --- | --- | --- |
| Undiluted | 1 m³/h | 1.2 bar | 300 kg/h |
| 10% diluted | 3.2 m³/h | 1.2 bar | 864 kg/h |
| 20% diluted | 6.7 m³/h | 1.2 bar | 1608 h |

This example confirms the results of example 1.

From a practical point of view, the amount of fuel oil needed for dilution can be injected using a displacement pump directly before or after the polymer pump, applying the necessary pressures, with the two liquids then passing through a Sulzer SMX static mixer giving a pressure drop of approximately 1 bar.

The invention claimed is:

1. A process for increasing, on an existing installation, amount of water-soluble polymer in an emulsion injected into a pipeline transporting oil produced at an offshore oil well, comprising, before injection, diluting the emulsion with non-solvent fuel oil found on a platform or Floating Production Storage & Offloading unit (FPSO) to produce a resulting mixture with reduced viscosity, and injecting the resulting mixture into the pipeline, whereby the amount of polymer injected into the pipeline increases due to increased rate of injection of the resulting mixture with reduce viscosity.

2. Process as claimed in claim 1, wherein the water-soluble polymer injected is in a reverse emulsion.

3. Process as claimed in claim 1, wherein the fuel oil represents between 1 and 40% of the emulsion by weight.

4. Process as claimed in claim 3, wherein the fuel oil represents between 5 and 20% of the emulsion by weight.

5. Process as claimed in claim 1, wherein:
the fuel oil is injected into an existing polymer feeder pipeline before a metering pump for said polymer to obtain a polymer/fuel oil mixture;
the polymer/fuel oil mixture is then metered with the metering pump;

the mixture after metering is then homogenized to obtain an homogenized mixture; and the homogenized mixture is injected into the pipeline transporting the oil produced at the offshore oil well.

6. Process as claimed in claim 1, wherein:

the polymer is metered;

the fuel oil is then injected into a pipeline transporting the metered polymer to obtain a polymer/fuel oil mixture;

the polymer/fuel oil mixture is then homogenized to obtain an homogenized mixture; and the homogenized mixture is injected into the pipeline transporting the oil produced at the offshore oil well.

7. Process as claimed in claim 1, wherein the water-soluble polymer comprises an anionic polymer, 70-30 acrylamide-sodium acrylate, at a concentration of 30%, with a molecular weight of 20 million, in reverse emulsion.

\* \* \* \* \*